United States Patent [19]

Mirumachi et al.

[11] Patent Number: 5,063,832
[45] Date of Patent: Nov. 12, 1991

[54] BLOWER UNIT FOR AUTOMOBILE AIR CONDITIONER

[75] Inventors: Mitsuaki Mirumachi, Mito; Hiroaki Mizoguchi, Ibaraki, both of Japan

[73] Assignees: Hitachi, Ltd., Tokyo; Hitachi Automotive Engineering Co., Ltd., Ibaraki, both of Japan

[21] Appl. No.: 596,511

[22] Filed: Oct. 12, 1990

[30] Foreign Application Priority Data

Oct. 20, 1989 [JP] Japan ................................. 1-271701

[51] Int. Cl.$^5$ .............................................. B60H 1/24
[52] U.S. Cl. ........................................... 98/2; 415/206
[58] Field of Search ................... 98/2, 2.05, 2.06, 2.11; 415/206

[56] References Cited

U.S. PATENT DOCUMENTS

| 2,117,011 | 5/1938 | Pratt | 415/206 X |
| 3,619,080 | 11/1971 | Bullock | 415/206 |

FOREIGN PATENT DOCUMENTS

| 534355 | 1/1955 | Belgium | 415/225 |
| 2137190 | 2/1973 | Fed. Rep. of Germany | 415/206 |
| 2723049 | 11/1978 | Fed. Rep. of Germany | 415/206 |
| 3408401 | 9/1985 | Fed. Rep. of Germany | 415/206 |
| 171712 | 9/1984 | Japan | 98/2.11 |
| 370370 | 4/1973 | U.S.S.R. | 415/206 |
| 2065866 | 7/1981 | United Kingdom | 98/2.11 |

*Primary Examiner*—Harold Joyce
*Attorney, Agent, or Firm*—Antonelli, Terry, Stout & Kraus

[57] ABSTRACT

A blower unit for an automobile air conditioner including a fan for introducing air through an air intake unit and for forcibly discharging air introduced to a casing of the automobile air conditioner through a discharge opening. A scroll casing includes a side wall, arranged around the fan, and a bottom wall closing the side wall. The side wall of the scroll casing is formed in a shape symmetrical about a center line thereof with the center line being parallel to an air streamline in the vicinity of the discharge opening. The side wall has opposed facing ends at the discharge opening. A nose member is mounted within the scroll casing close to one of the opposed facing ends of the side wall.

8 Claims, 5 Drawing Sheets

BLOWER UNIT FOR AUTOMOBILE AIR CONDITIONER

BACKGROUND OF THE INVENTION

The present invention relates to a blower unit of an automobile air conditioner and, more particularly, to a scroll casing of the blower unit.

A typical example of the known automobile air conditioner is disclosed in Japanese Patent Unexamined Publication No. 59-171712 in which an air intake fan with an air intake port is detachably mounted in a scroll casing. The air intake fan is arranged in the scroll casing at a position symmetrical with respect to an air streamline in the scroll casing.

More specifically, the shape of the air conditioner, except the blower unit, and a connecting portion of the blower unit are formed symmetrically with respect to the air streamline to be commonly used in both right and left steering wheel automobiles.

The prior art, however, fails to take into consideration the common use of the blower unit for both right and left steering wheel automobiles. In the known blower unit, only the air intake port connecting portion and the fixing lugs are arranged symmetrically, and a problem encountered in the prior art resides in fact that it is not possible to use the blower unit for both right and left steering wheel automobiles for reasons of the installation space and the mounting of the blower unit.

This results in that two types of blower units are necessary for one type for automobile with steering wheels different in position. Thus, the production cost, such as cost of metallic molds is doubled, and moreover maintenance of the blower unit takes considerable time.

SUMMARY OF THE INVENTION

Accordingly, it is an object of the present invention to provide a blower unit of an automobiles air conditioner which blower unit can be commonly used for both right and left steering wheel automobiles and is hence less expensive than the known blower units.

With this and other objects in view, one aspect of the present invention is directed to a blower unit for an automobile air conditioner, with the blower unit being of the type including a fan for introducing air through an air intake unit and for forcibly discharging air introduced to a casing of the automobile air conditioner through a discharge opening. The blower unit comprises a scroll casing including a side wall, arranged around the fan, and a bottom wall closing the side wall, with the bottom wall having means for defining a fan opening formed therethrough for fitting the fan into the scroll casing through the fan opening. A nose member is provided along with attaching means for attaching the nose member to the scroll casing. The side wall of the scroll casing is formed in a shape symmetrical about a center line thereof, with the center line being parallel to an air streamline in the vicinity of the discharge opening, and with the side wall having oppositely facing ends at the discharge opening. The nose member is mounted within the scroll casing close to one of the oppositely facing ends of the side wall through the attaching means.

According to another aspect of the present invention, comprises a scroll casing including side surrounding means, arranged around the fan, for surrounding the fan, and a bottom wall closing the side wall, with the bottom wall having means for defining a fan opening formed therethrough for fitting the fan into the scroll casing through the fan opening. A nose member is attached to the scroll casing, and the side surrounding means is formed in a shape symmetrical about a center line thereof in a plan view. The center line is perpendicular to an air streamline in the vicinity of the discharge opening, and the side surrounding means include an arcuate side wall having opposing ends and another side wall oppositely facing the arcuate side wall. The nose member is mounted to one of the opposing ends of the arcuate side wall within the scroll casing close to the opening.

DETAILED DESCRIPTION OF THE PREFERRED EMBODIMENTS

Figure 1:
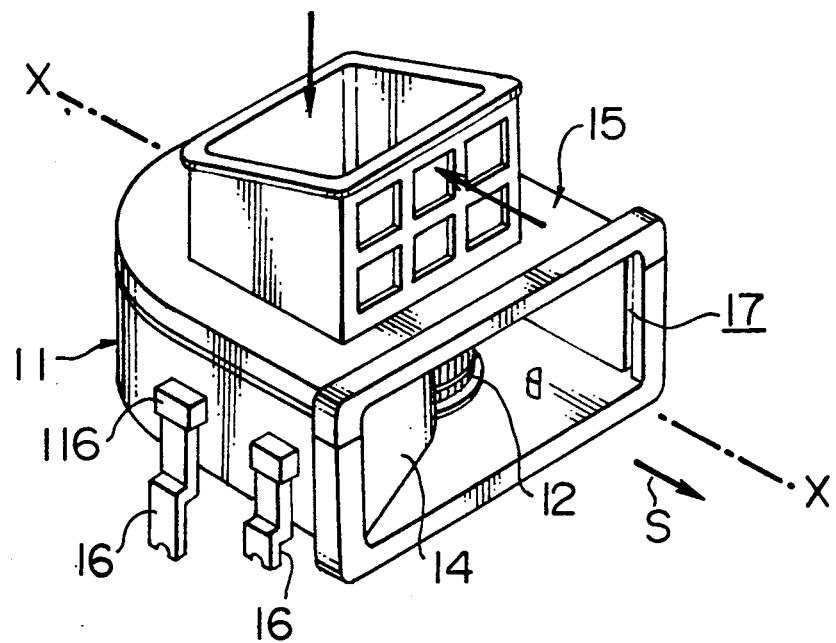
FIG. 1 is a perspective view of one embodiment of the present invention.
Figure 2A:
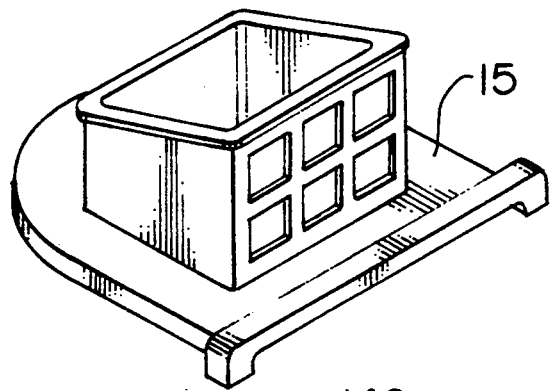
FIGS. 2A to 2E are perspective views of components of the blower unit of FIG. 1.
Figure 2B:
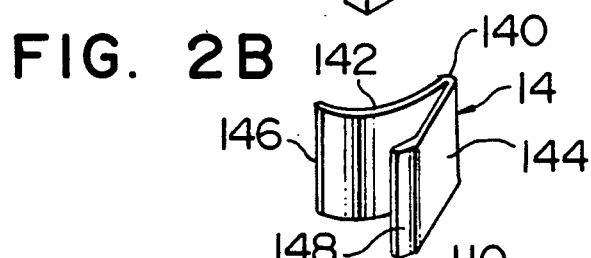
Figure 2C:
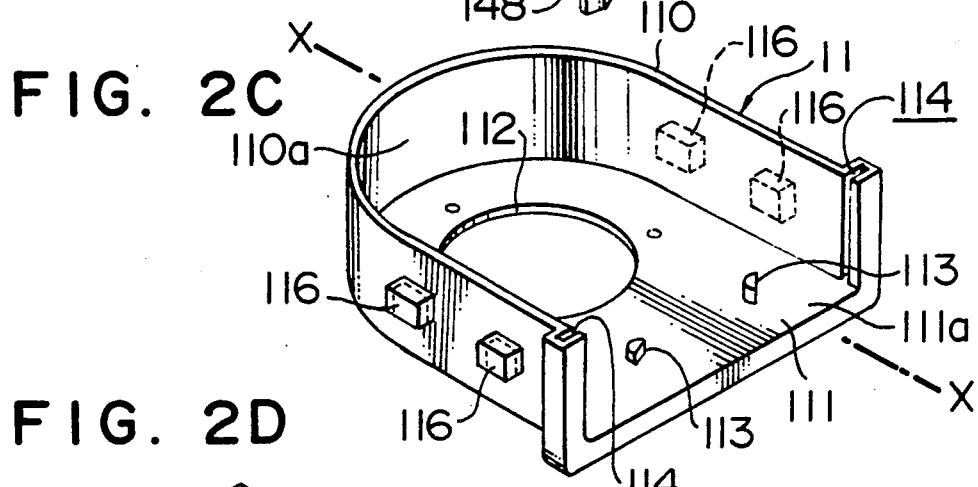
Figure 2D:
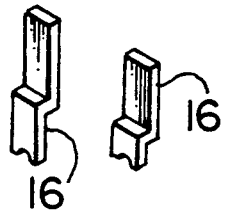
Figure 2E:
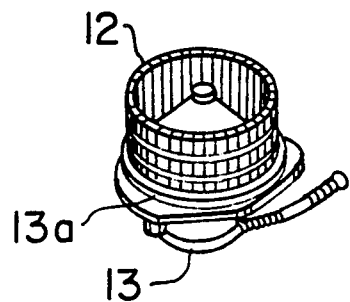

As clearly shown in FIG. 2C, a blower in accordance with the present invention includes a scroll casing 11 molded from a synthetic resin and shaped symmetrically about a center line X-X disposed in parallel with an air streamline, shown by the arrow S in FIG. 1, in the vicinity of a discharge opening 17 of the scroll casing 11. The scroll casing 11 is generally U-shaped and includes a generally U-shaped side wall 110 and a bottom wall 111 closing lower open end of the side wall 110. The upper end of the side wall 110 is opened. The bottom wall 111 is formed with a fan opening 112. A fan 12 is fitted into the scroll casing 11 through the fan fitting opening 112, and a motor 13 thereof is fixed at its flange 13o bottom wall 111. The side wall 110 is provided in inner surfaces of its ends close to the discharge opening 17 (FIG. 1) with vertical nose locking grooves 114 and 114, respectively.

A pair of trigonal prism locking brackets 113 are integrally formed to project upwardly from an upper surface 111a of the bottom wall 111 so that apices of the locking brackets 113 are disposed in opposite to each other. A substantially V-shaped nose 14 is engaged at an inner corner of its apex 140 with one of the locking brackets 113 and 113. The nose 14 includes an arcuate side wall 142 and a flat side wall 144. The side wall 114 has an inwardly bent end portion 148, which is fitted into one of nose locking grooves 114 and 114, with the one locking groove 114 being adjacent to the locking bracket 113 engaged with the apex 140 of the nose 14 as shown by the dot-and-dash line in FIG. 4. The side wall 142 is brought into abutment at its end 146 with an inner surface 110a of the side wall 110. The nose 14 is clamped at the upper and lower edges thereof between the intake unit 15 and the bottom wall 111, respectively.

The intake unit 15 is also molded from a synthetic resin and includes inside and outside air intake mechanisms (not shown) and an intake door mechanism (not shown) for switching the introduction of inside and outside air. The intake unit 15 is fitted over and firmly secured to the side wall 110 of the scroll casing 11 through locking pins (not shown), an adhesive, etc.

The side wall 110 of the scroll casing 11 is provided on its outer surface with several fixing lug points 116, and a fixing lug 16 is fitted at its upper end into each of the fixing lug joints attach to the side wall 110.

FIG. 1 illustrates a built blower unit for left steering wheel automobile. In the blower unit, inside or outside air is forcedly introduced into the scroll casing 11 through the intake unit 15 and then discharged into a casing 18 of an automobile air conditioner (FIGS. 8A and 8B) through the discharge opening 17.

Figure 3:
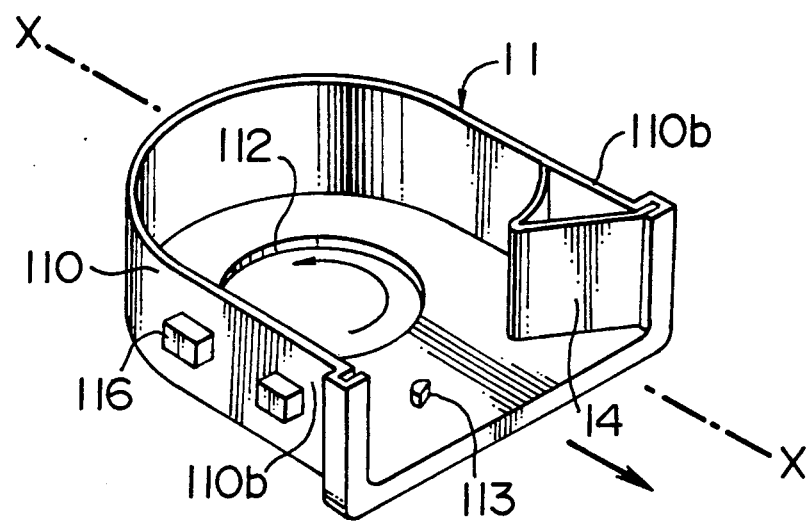
FIG. 3 is a perspective view of the scroll casing of FIG. 1, with a nose placed at a position for a right steering wheel automobile.
Figure 8A:
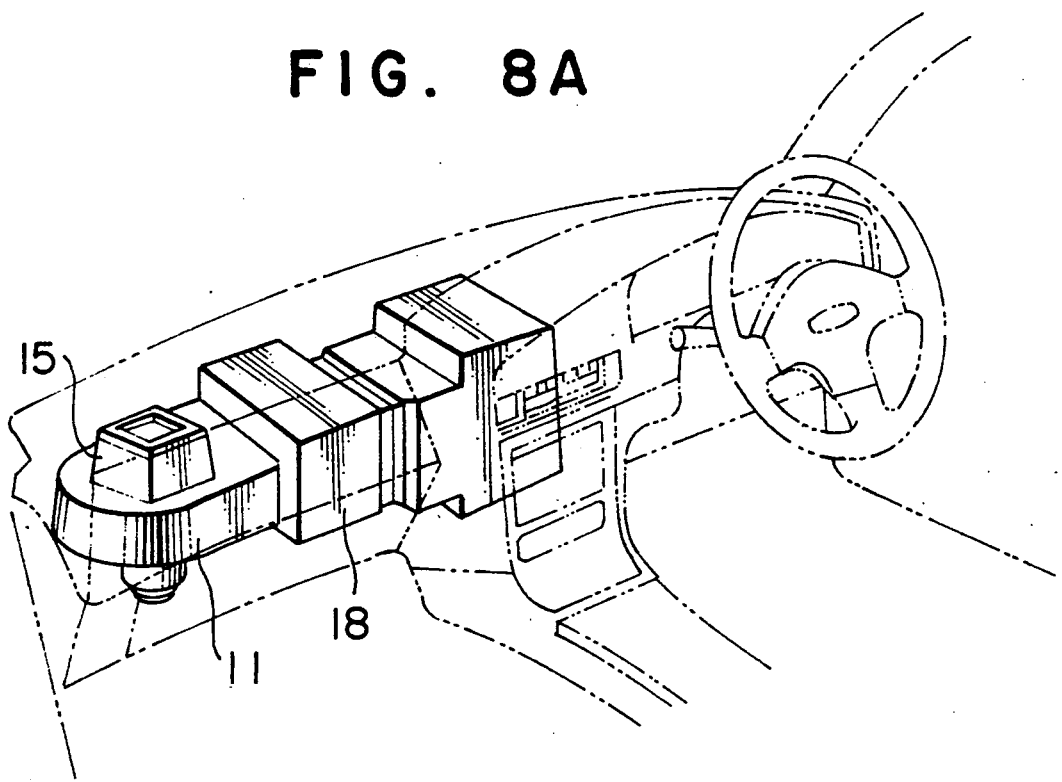
FIG. 8A is a perspective view on a reduced scale of an automobile air conditioner using the blower unit of FIG. 1 although the scroll casing of FIG. 3 is employed.
Figure 8B:
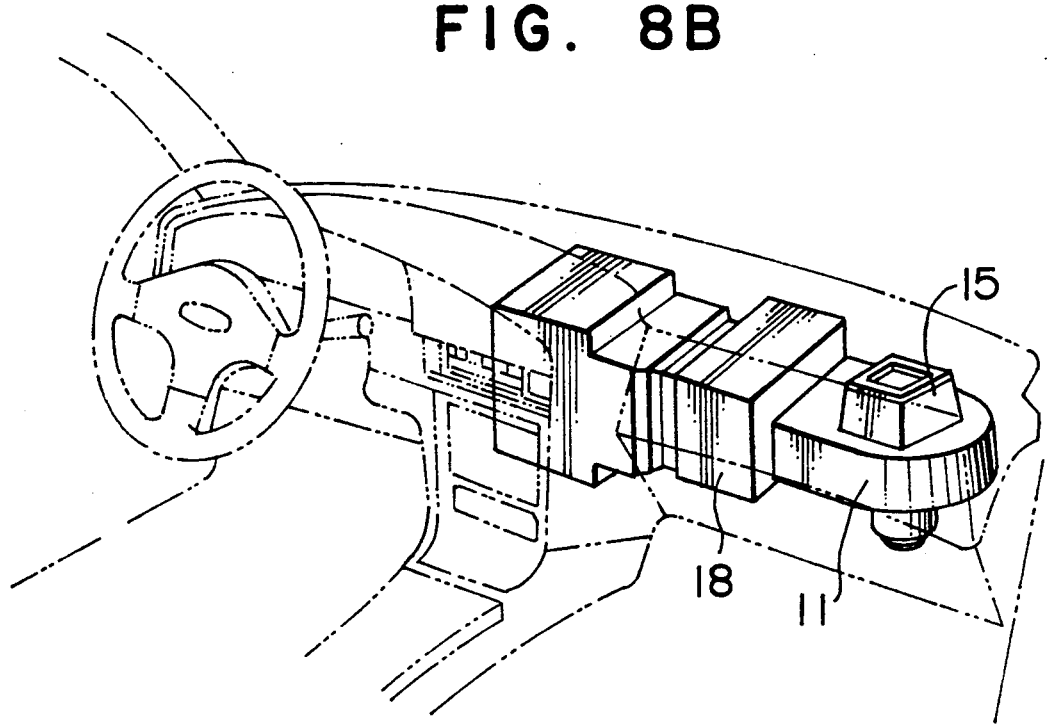
FIG. 8B is a perspective view on a reduced scale of another automobile air conditioner using the blower unit of FIG. 1.

FIG. 3 shows a scroll casing 11 with a noes 14 arranged for a right steering wheel automobile. The nose 14 is mounted to the side wall 110 in a symmetrical manner to the nose 14 of FIG. 1, and a blower unit 11 is assembled for a blower unit for a right steering wheel automobile in the same manner as the blower unit in FIG. 1. The blower unit thus assembled is communicated to an upstream side of the casing 18 of an automobile air conditioner as shown in FIG. 8A. Usually, the blower unit and the casing 18 are fixed to a body of an automobile by bolts, and the blower unit and the casing 18 are hermetically connected through an elastic member such as a sponge.

Figure 4:
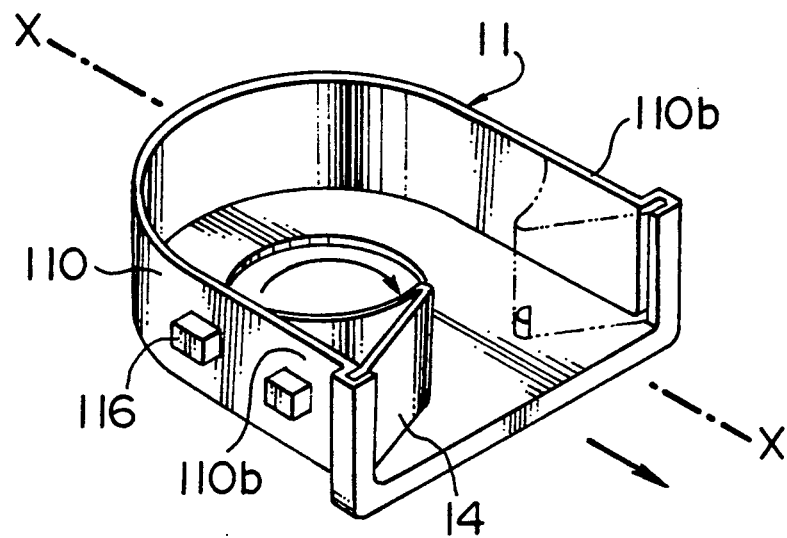
FIG. 4 is a perspective view of the scroll casing of FIG. 1, with a nose placed at another position for a left steering wheel automobile.

In a blower unit for a left steering wheel automobile, the nose 14 is, as shown in FIG. 4, mounted to one end 110b of the side wall 110, the one end 110b oppositely facing to the other end 110b to which is mounted the nose 14 for the right steering wheel automobile as indicated by the dot-and-dash line. The fan 12 is set to rotate in a direction reverse to the rotation direction of the fan 12 of the blower unit for the right steering wheel automobile. It is preferable to use a motor 13 rotatable in the opposite directions.

In this embodiment, the scroll casing 11 is formed in a shape symmetrical to the center line X—X, and hence the blower unit employing the scroll casing 11 may be commonly used for both right and left steering wheel automobiles by shifting the nose 14 to the symmetrical position and by reversing the fan 12. Moreover, similar maintenance and inspection operations of the blower units are carried out at symmetrical or similar portions, and labor for the maintenance and inspection operations is considerably reduced as compared to the conventional blower units.

Figure 5:
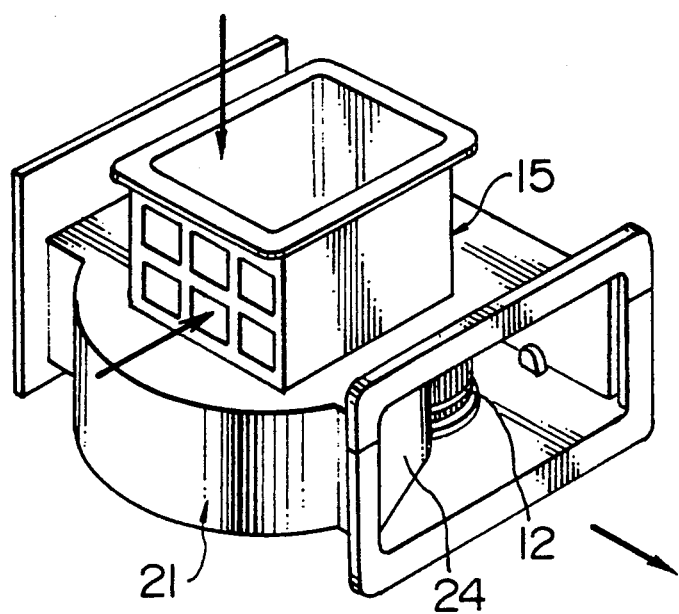
FIG. 5 is a perspective view of another embodiment of the present invention.
Figure 6A:
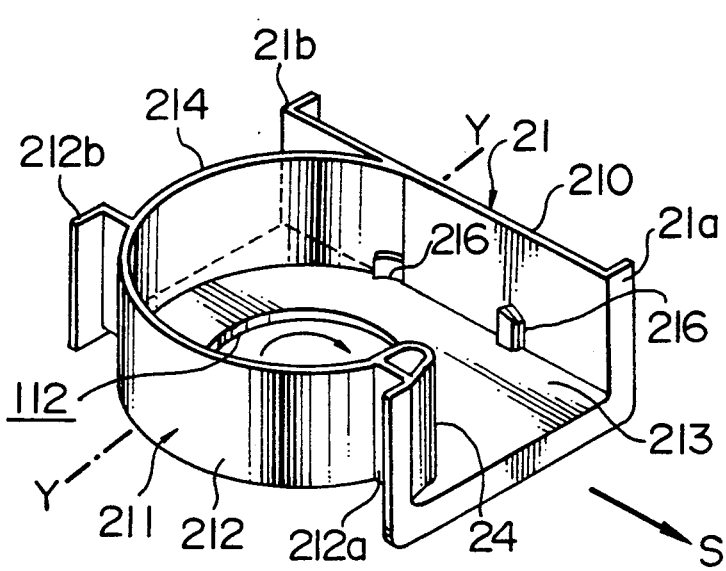
FIG. 6A is a perspective view of the scroll casing of FIG. 5, with a nose and a closure wall mounted at positions for a right steering wheel automobile.
Figure 6B:
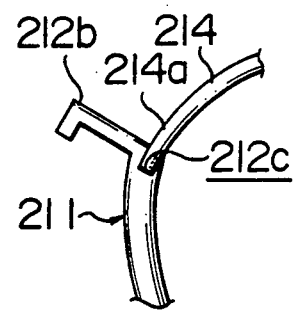
FIG. 6B is an enlarged fragmentary plan view illustrating the connection of the closure wall to the arcuate side wall of FIG. 6A.
Figure 6C:
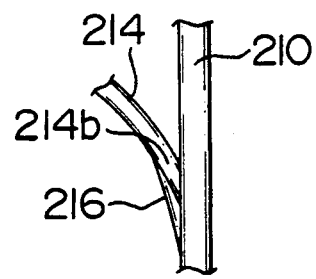
FIG. 6C is an enlarged fragmentary plan view illustrating the connection of the closure wall to the flat side wall of FIG. 6A.
Figure 7:
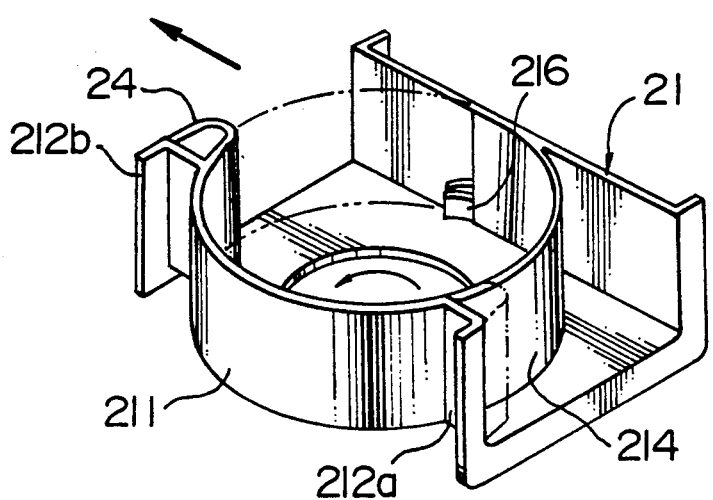
FIG. 7 is a perspective view of the scroll casing which is different from the scroll casing of FIG. 5, in that the closure wall is mounted at a position for a left steering wheel automobile.

Another embodiment of the present invention is illustrated in FIGS. 5 to 7, in which parts corresponding to parts of the blower unit of the preceding embodiment are designated by the same reference numerals and descriptions thereof are omitted. As clearly shown in FIGS. 6A and 7, a scroll casing 21 is formed symmetrically about center line Y-Y perpendicular to the air streamline S. The scroll casing 21 includes a flat side wall 210, a substantially arcuate side wall 211 facing to the flat side wall 210 and a bottom wall 213 bridging the arcuate side wall 211 and the flat side wall 210. The arcuate side wall 211 is curved so as to correspond to the circumferential surface of the fan 12. The arcuate side wall 211 includes an arcuate portion 212 which terminates at its opposite ends in channel-shaped nose supporting portions 212a and 212b. The scroll casing 21 of this embodiment is distinct from the scroll casing 11 of the first embodiment in that the scroll casing 21 has opposite open portions 21a and 21b. When the scroll casing 21 is used for a right steering wheel automobile, the open portion 21b is closed by an arcuate closure wall 214, and a nose 24 is mounted to one end 212a of the arcuate side wall 211 in the vicinity of the open portion 21a as illustrated in FIG. 6A. The scroll casing 21 is molded from a synthetic resin as well as the closure wall 214. The closure wall 214 is arranged to define an arc together with the arcuate portion 212 of the arcuate side wall 211 to correspond to the circumferential surface of the fan 12. One end 214a of the closure wall 214 is fitted into a vertical groove 212c formed in the inner surface of the arcuate portion 212 close to the other end 212b as shown in FIG. 6B while the other end 214b is locked by a tongue 216 mounted to the inner surface of the flat side wall 210 as in FIG. 6C.

To use the scroll casing 21 of FIG. 6A as a scroll casing for a left steering wheel automobile, the one end 214a of the closure wall 214 is removed from the vertical groove 212c in the vicinity of the end 212b of the arcuate side wall 211 and is then fitted in another vertical groove 212c (not shown) formed in the arcuate portion 212 close to the another end 212a whereas, the other end 214b is locked by another tongue 216 (not shown in FIG. 7) mounted to the inner surface of the flat side wall 210 close to the open portion 21a. The nose 24 is mounted on the inner surface of the end 212b of the arcuate side wall 211.

The blower unit of FIG. 5 can be used for both right and left steering wheel automobiles without turning the scroll casing 21 a in the blower unit of FIG. 1.

What is claimed is:

1. A blower unit for an automobile air conditioner, the blower unit including a fan for introducing air into the blower unit through an air intake unit and for forcibly discharging air introduced to a casing of the automobile air conditioner through a discharge opening, the blower unit comprising:
 a scroll casing including a side wall, arranged around the fan, and a bottom wall closing the side wall, the bottom wall having means for defining a fan opening formed therethrough for accommodating the fan in the scroll casing;
 a nose member; and
 attaching means for attaching the nose member to the scroll casing;
 wherein the side wall of the scroll casing is formed in a shape symmetrical about a center line thereof, said center line being disposed in parallel to an air stream line in the vicinity of the discharge opening, said side wall having opposed facing ends at the discharge opening; and wherein the nose member is mounted within the scroll casing close to one of the opposed facing ends of the side wall by said attaching means.

2. A blower unit as recited in claim 1, wherein the side wall is substantially U-shaped in plan view; and wherein the side wall includes an arcuate portion corresponding in shape to a circumferential surface of the fan.

3. A blower unit as recited in claim 1, wherein the nose member is detachable connected to the side wall.

4. A blower unit as recited in claim 3, wherein the side wall is substantially U-shaped; and wherein the side wall includes an arcuate portion corresponding in shape to a circumferential surface of the fan.

5. A blower unit as recited in claim 1, wherein the nose member is substantially V-shaped in a plan view and includes an apex portion and a pair of side walls having respective distal ends;

the opposed facing ends of the side wall each include an inner surface; the attaching means comprises:

a pair of locking brackets mounted on the bottom wall of the scroll casing symmetrically to the center line so as to project into the scroll casing, each locking bracket being adapted to engage the apex portion of the nose member; and vertical holding groove defining means for defining a vertical holding groove formed in each of he inner surfaces of opposed facing ends of the side wall, each holding groove being adapted to engage one distal end of the nose member for holding the nose member.

6. A blower unit as recited in claim 5, wherein the side wall is substantially U-shaped in a plan view; and the side wall includes an arcuate portion corresponding in shape to a circumferential surface of the fan.

7. A blower unit as recited in claim 1, wherein the scroll casing comprises fixing by attaching means for attaching fixing lugs to the side wall.

8. A blower unit as recited in claim 7, wherein the side wall is substantially U-shaped in a plan view; and the side wall includes an arcuate portion corresponding in shape to a circumferential surface of the fan.

* * * * *